United States Patent
Ekstrand

(10) Patent No.: US 8,059,090 B2
(45) Date of Patent: Nov. 15, 2011

(54) NAVIGATION DEVICE

(75) Inventor: Simon Ekstrand, Eslov (SE)

(73) Assignee: Sony Ericsson Mobile Communications AB, Lund (SE)

( * ) Notice: Subject to any disclaimer, the term of this patent is extended or adjusted under 35 U.S.C. 154(b) by 864 days.

(21) Appl. No.: 11/692,351

(22) Filed: Mar. 28, 2007

(65) Prior Publication Data

US 2008/0238872 A1  Oct. 2, 2008

(51) Int. Cl.
  G09G 5/00   (2006.01)
  G09G 5/08   (2006.01)
  G06F 3/033  (2006.01)

(52) U.S. Cl. .......................... 345/156; 345/161

(58) Field of Classification Search .................. None
See application file for complete search history.

(56) References Cited

U.S. PATENT DOCUMENTS

| | | | | |
|---|---|---|---|---|
| 3,708,636 | A * | 1/1973 | Sobchak | 200/6 A |
| 4,769,517 | A * | 9/1988 | Swinney | 200/6 A |
| 4,782,327 | A * | 11/1988 | Kley et al. | 341/2 |
| 4,794,388 | A * | 12/1988 | Matthews | 345/661 |
| 5,259,684 | A * | 11/1993 | Scharer | 403/174 |
| 5,963,196 | A | 10/1999 | Nishiumi et al. | |
| 6,057,540 | A * | 5/2000 | Gordon et al. | 250/221 |
| 6,633,336 | B2 * | 10/2003 | Toyoizumi et al. | 348/333.02 |
| 6,795,055 | B1 * | 9/2004 | Culler | 345/157 |
| 2002/0196231 | A1 * | 12/2002 | Dobies et al. | 345/161 |
| 2003/0206151 | A1 | 11/2003 | Oross et al. | |
| 2005/0057501 | A1 | 3/2005 | Young et al. | |
| 2006/0252532 | A1 * | 11/2006 | Stovall | 463/30 |

FOREIGN PATENT DOCUMENTS

| | | |
|---|---|---|
| WO | 2005/022285 | 3/2005 |
| WO | WO2005/026932 * | 3/2005 |
| WO | 2005/055035 | 6/2005 |

OTHER PUBLICATIONS

International Search Report for corresponding Application No. PCT/EP2007/058936 mailed Dec. 18, 2007.
Written Opinion of the International Searching Authority for corresponding Application No. PCT/EP2007/058936 mailed Dec. 18, 2007.
International Search Report for corresponding Application No. PCT/EP2005/007402 mailed Oct. 5, 2005.
International Preliminary Report on Patentability for corresponding Application No. PCT/EP2007/058936 (date of completion of this report May 13, 2009).

* cited by examiner

Primary Examiner — Amare Mengistu
Assistant Examiner — Antonio Xavier
(74) Attorney, Agent, or Firm — Renner, Otto, Boisselle & Sklar, LLP

(57) ABSTRACT

The invention relates to a navigation device (2) for an electronic device (1), particularly a navigation device of the joystick type with two operating positions. In one position the navigation device (2) is extended as a joystick and in a second position the navigation device is retracted to function as a rocker key.

15 Claims, 2 Drawing Sheets

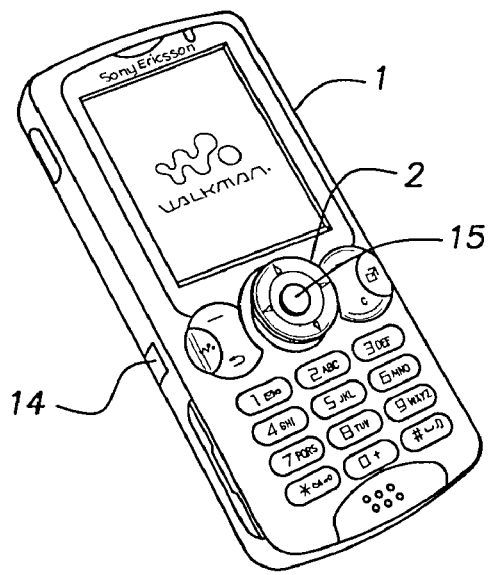
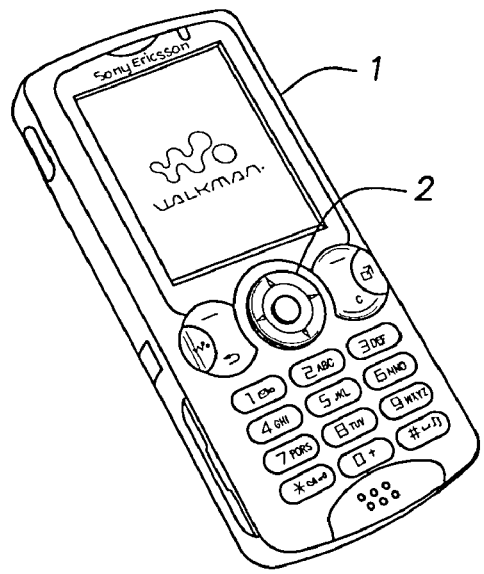
Fig. 1    Fig. 2
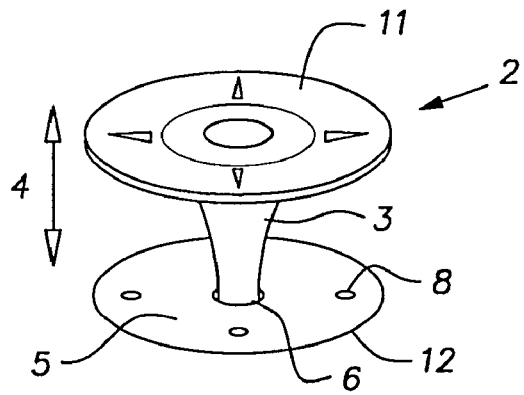
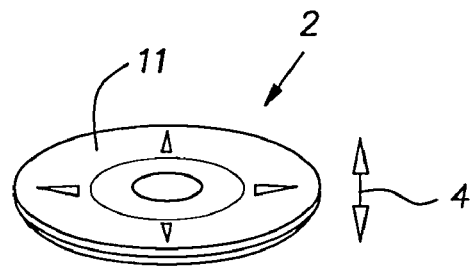
Fig. 3    Fig. 4
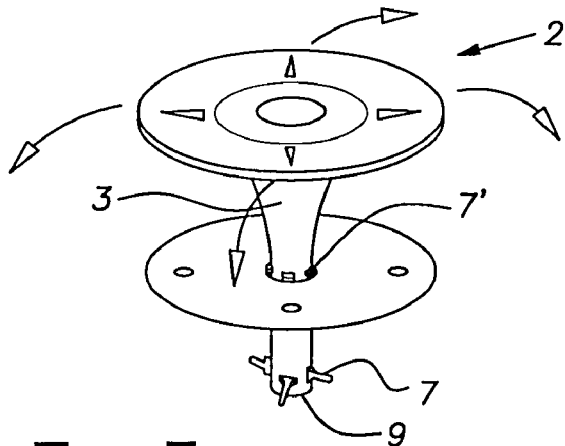
Fig. 5

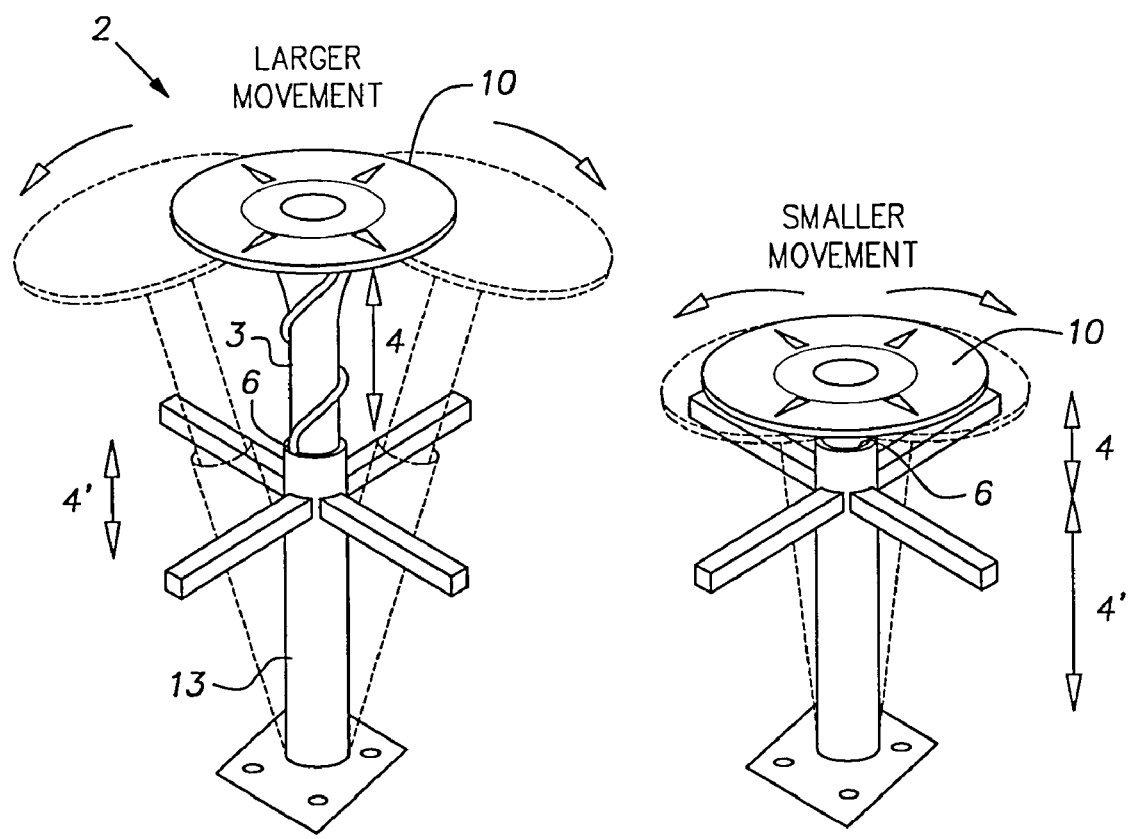

NAVIGATION DEVICE

FIELD OF THE INVENTION

The present invention relates to a navigation device for an electronic device, particularly a navigation device of the joystick type with two operating positions. In one position the navigation device is extended as a joystick and in a second position the navigation device is retracted to function as a rocker key.

BACKGROUND OF THE INVENTION

Many electronic devices are provided with a navigation device for controlling the operation of the device by inputting signals depending on actuation of the navigation device. For example, many mobile phones are provided with navigation devices in the form of short joysticks or rocker keys to navigate in menus and play games etc. Small electronic devices, like mobile telephones, are often kept in pockets so no protruding objects on the device are desired. Thus, to keep the mobile phones small, the navigation devices are normally made as small as possible.

On the other hand, more and more games and other programs that need precision of navigation are put in the phones. There is a conflict between making the phones as small as possible and making good navigation devices with good feeling and grip. Especially when the user has large fingers, it can be really hard to navigate easily, resulting in that the user makes errors or just feels frustrated because the user needs to focus too much on the navigation itself.

In game controllers for video game machines normally one or more large joysticks are used. See e.g. U.S. Pat. No. 5,963, 196 for reference. FIGS. 11-14 show an example of a design of a joystick mechanism. Such a joystick is well suited for playing games as well as navigation in menus etc, but is not suitable for small portable devices, as is takes too much place.

An object of the invention is to provide a navigation device not protruding in one operation position, and having another extended operation position providing good feeling and grip.

SUMMARY OF THE INVENTION

Generally the present invention provides a navigation device which is extendible to an operation state with a relatively larger working lever, and retractable to another operation state with a relatively shorter working lever.

According to one aspect, the invention provides a navigation device for an electronic device, comprising:
a lever carried by a suspension mechanism allowing movement in several directions for inputting signals to the electronic device;
a number of pressure sensitive switches capable of outputting signals in response to pressure applied by means of the lever;
wherein the lever may be shifted between two operation positions, of which the lever in a first position is acting with a relatively longer working lever, and of which the lever in a second position is acting with a relatively shorter working lever.

In one embodiment, a set of switches is arranged at or near one end of the lever in a guide member.

Said switches may be analog switches.

In a further embodiment, the navigation device further comprises an operation position detector, and said switches are controlled to operate in a first pressure sensitivity range with a larger range in the first operation position, and in a second pressure sensitivity range with a smaller range in the second operation position.

In a further embodiment, the pressure sensitivity ranges are quantized to two digital values in dependence of a current operation mode of the electronic device.

Suitably, the second pressure sensitivity range is quantized to two digital values.

Suitably, the signals output by the switches are quantized to equal four directions of movement of the lever.

In a still further embodiment, a first set of switches is arranged at or near one end of the lever in a guide member, and a second set of switches is arranged at or near at a second opposite end of the lever.

The second set of switches may be arranged on a support and a plate attached to or integral with the second end of the lever.

In one embodiment, the first set of switches comprises analog switches, and the second set of switches comprises digital switches.

The suspension mechanism may comprise a spring-loaded bayonet mechanism.

The suspension mechanism may comprise a spring-loaded push button mechanism, arranged to let the navigation device be shifted between the operation positions by a push operation.

The suspension mechanism may comprise a spring-loaded latch button, arranged to let the navigation device be shifted to the first operation position by actuating the latch button and to let the navigation device be shifted to the second operation position by pushing in the navigation device.

According to a second aspect, the invention provides an electronic device comprising a navigation device as mentioned above.

The electronic device may be a mobile telephone, a pager, a communicator, an electronic organizer, a smart phone, a digital camera, an audio or a video player, or a game device.

BRIEF DESCRIPTION OF THE DRAWINGS

Further objects, features and advantages of the invention will appear from the following detailed description of embodiments of the invention, wherein embodiments of the invention will be described more in detail with reference to the accompanying drawings, in which:

FIG. 1 is a perspective view of a mobile telephone with a navigation device according to the invention in an extended operation position, FIG. 2 is a perspective view of the mobile telephone in FIG. 1 with the navigation device in a retracted operation position, FIG. 3 is a schematic view of a navigation device according to one embodiment of the invention in an extended position, FIG. 4 is a schematic view of the navigation device of FIG. 3 in a retracted position, FIG. 5 is a schematic view of an embodiment of the invention showing a lever member with microswitches, FIG. 6 is a schematic of an embodiment of the invention with the lever arranged in a guide member in an extended position, and FIG. 7 is a schematic view of the navigation device of FIG. 6 in a retracted position.

DETAILED DESCRIPTION OF PREFERRED EMBODIMENTS

The invention relates to a navigation device, particularly suited for incorporation in small portable electronic devices, such as mobile telephones, pagers, communicators, electronic organizers, smart phones, digital cameras, audio and video players and game devices. The navigation device forms part of the user interface used to control the electronic device. The operation and the design of the user interface and electronic device may be conventional.

The basic idea of the invention is to use a suspension mechanism for a lever member, enabling two operation states or positions. FIGS. 1 and 2 show examples of the outer appearance of an electronic device 1 provided with a navigation device 2 according to an embodiment of the invention.

In a first operation position as shown in FIG. 1, the navigation device is extended, resulting in a large working lever as will be explained below. In FIG. 2, the navigation device 2 is retracted or pushed in, resulting in a relatively smaller working lever. In this position, the outer appearance of the navigation device 2 is similar to a conventional navigation device.

To detect movement of the navigation device 2, pressure sensitive switches are provided in the navigation device mechanism. The switches may be digital switches capable of only two output signals, either off or on, or may be analog switches in which the output signal is substantially proportional to the pressure or force applied on the switch. Such switches are known components within this field.

As is conventional in mobile telephones, the navigation device may also comprise a centre key 15 (FIG. 1), having the same function in both operation positions.

FIG. 3 shows an embodiment of the navigation device 2 comprising a lever member 3 and a suspension mechanism 5. In the extended position shown, the navigation device operates with a working lever 4 between the top of the navigation device 2 and a fulcrum or pivot point 6 of the suspension mechanism 5. In the retracted position of the navigation device 2 shown in FIG. 4, it will be seen that the working lever 4 is relatively smaller.

The suspension mechanism 5 comprises hinges, levers and/or ball joints allowing movement in all directions.

FIG. 5 shows an embodiment of the navigation device 2. Here, the navigation device is provided with one set of switches 7, arranged at one end 9 of the lever member 3. In an alternative embodiment, the pivot point of the suspension mechanism is instead at the lower end 9 of the lever 3 and a set of micro switches 7' is arranged at approximately the middle of the lever member 3. The discussion below with regard to the forces on the switches applies both for the position at 7 and 7'.

In the embodiments shown in FIGS. 6 and 7, the lever member 3 is inserted in a guide member 13. The guide member 13 provides the reaction forces on the switches when the user moves the top 10 of the navigation device 2.

In the extended position shown in FIG. 6, the larger working lever 4 above the fulcrum 6 and the relatively smaller working lever 4' below the fulcrum 6 will result in that a force applied on top 10 of the navigation device will result in a relatively large force on the switches.

In FIG. 7, the navigation device 2 is shown in the retracted operation position. In this case, a smaller working lever 4 above the fulcrum 6 and a larger working lever 4' below the fulcrum will result in a relatively lower force applied on the switches, provided the user applies the same force on top 10 of the navigation device 2.

In a particular embodiment, the navigation device 2 comprises an operation position detector, e.g. a switch at one position in the guide member 13, outputting a signal making the navigation device 2 aware of the current operation state of the navigation device. In the first operation position shown in FIG. 6, the pressure on the switches is translated using a first range adapted to the longer working lever 4. Assuming a nominal pressure scale of 0-100, the user could easily control the pressure within the whole range, of which the value 50 is considered normal (medium force).

In the second operation position shown in FIG. 7, the shorter working lever 4 would result in that the maximum force applied by the user, with the same pressure scale 0-100, is at approximately value 20, with a normal value at 10 (medium force). Then, in the second operation position only the range 0-20 is used. Thus, pressure value 100 in the first operation position would result in the same navigation as pressure value 20 in the second operation position.

In a further embodiment instead of a scale 0-100, the output signals of the navigation device are quantized into two digital values, suitably Off or zero for values below 50, and one or On for values above 50, in the first operation mode shown in FIG. 6. For the retracted position shown in FIG. 7, the break point will be the normal value 10.

In a still further embodiment the output signals of the navigation device are quantized only in the retracted position, as this operation mode is more suited to coarse navigation.

These quantized operation modes are suitable for some applications and functions of the user interface of the electronic device. Suitably, the user interface of the electronic device may control the navigation device 2 whether analog or quantized digital values should be applied.

In a further embodiment as shown in FIG. 3, the navigation device 2 is provided with a second set of switches 8, provided on a support 12 below a pressure plate 11 arranged at the top of the navigation device. This set of switches 8 is operable in the retracted position of the navigation device, as shown in FIG. 4 (switches hidden by the plate 11). Then in this operation state, the first set of switches 7 or 7' is not used. The second set of switches 8 may be analog switches, or digital switches if only navigation in e.g. four directions, typically up, down, left and right, is required in the retracted position.

With analog switches, the output signals of a number of switches are combined to enable navigation in intermediate directions between the four main directions up, down, left and right.

The joystick operation mode with the full range of analog output signals and directions is useful for example when playing games, but also in the telephone mode of a mobile phone. For example the speed of fast forwarding in a video/music player mode, navigation in lists and menus et cetera could be dependent of the applied pressure on the navigation device with good precision.

Generally, the suspension mechanism of the navigation device enables locking the device in the extended and retracted positions. Many different mechanisms are possible within the scope of the invention. A non-limiting list of examples is set forth below.

In one embodiment, the navigation device 2 comprises a screw-thread for shifting between the operation positions.

In another embodiment, the suspension mechanism 5 is provided with a spring-loaded bayonet catch. Starting from the retracted position, the top of the navigation device is rotated a small angle releasing a catch, letting a spring push up the navigation device to the extended position. The navigation device is retracted by pushing against the spring and rotating the device in the lower retracted position to activate the bayonet catch.

In a further embodiment, the suspension mechanism comprises a push button mechanism. One push will release the navigation device from the lower position into the extended position. Next push will lock the navigation device in the retracted position, similarly to the mechanism in a ballpoint pen.

In a still further embodiment, the suspension mechanism comprises a catch, which may be activated by means of a latch button 14 (FIG. 1). Activation of the latch button 14 releases the catch and allows a spring to push the navigation device 2 to the extended position. A simple push down on the navigation device will again activate the catch in the lower position.

Various embodiments of the present invention have been outlined above and specific examples have been described in detail with reference to the appended drawings. It should be noted that the invention is not limited to these specific examples, but may be modified within the scope defined by the claims below.

The invention claimed is:

1. A navigation device for an electronic device, comprising:
   a lever carried by a suspension mechanism allowing movement in several directions for inputting signals to the electronic device;
   a first set of pressure sensitive switches and a second set of pressure sensitive switches, wherein the first set of pressure sensitive switches and the second set of pressure sensitive switches are axially spaced apart along the lever and the lever may be shifted between a first operative position and a second operative position such that in the first operative position the first set of pressure sensitive switches are operable to output signals in response to pressure applied by lever and in the second operative position the second set of pressure sensitive switches are operable to output signals applied by the lever, wherein the lever in the first operative position is a longer lever than the lever in the second operative position; and the first set of switches being controlled to operate in a first pressure sensitivity range with a larger range in the first operative position than a second pressure sensitivity range associated with the second set of pressure sensitive switches when positioned in the second operative position, wherein only the first set of pressure sensitive switches or the second set of pressure sensitive switches are operable depending on the operative position of the lever.

2. A navigation device as claimed in claim 1, wherein the first set of pressure sensitive switches is arranged at or near one end of the lever; and wherein the lever is inserted in a guide member.

3. A navigation device as claimed in claim 2, wherein said switches are analog switches.

4. A navigation device as claimed in claim 3, wherein the pressure sensitivity ranges are quantized to two digital values in dependence of the lever being in the first operative position or the second operative position.

5. A navigation device as claimed in claim 4, wherein the second pressure sensitivity range is quantized to two digital values.

6. A navigation device as claimed in claim 4, wherein the signals output by the first set of pressure sensitive switches or the second set of pressure sensitive switches are quantized to equal four directions of movement of the lever.

7. A navigation device as claimed in claim 1, wherein the second set of pressure sensitive switches is arranged on a support and a plate attached to or integral with the second end of the lever.

8. A navigation device as claimed in claim 1, wherein the first set of pressure sensitive switches comprises analog switches, and the second set of pressure sensitive switches comprises digital switches.

9. A navigation device as claimed in claim 1, wherein the suspension mechanism comprises a spring-loaded bayonet mechanism.

10. A navigation device as claimed in claim 1, wherein the suspension mechanism comprises a spring-loaded push button mechanism, arranged to let the navigation device be shifted between the operation positions by a push operation.

11. A navigation device as claimed in claim 1, wherein the suspension mechanism comprises a spring-loaded latch button, arranged to let the navigation device be shifted to the first operation position by actuating the latch button and to let the navigation device be shifted to the second operation position by pushing in the navigation device.

12. An electronic device comprising a navigation device as claimed in claim 1.

13. An electronic device as claimed in claim 12, wherein the electronic device is a mobile telephone, a pager, a communicator, an electronic organizer, a smart phone, a digital camera, an audio or a video player, or a game device.

14. The navigation device of claim 1, wherein when in the first operative position, the second set of pressure sensitive switches are not operable to output signals in response to the applied pressure.

15. The navigation device of claim 1, wherein when in the second operative position, the first set of pressure sensitive switches are not operable to output signals in response to the applied pressure.

* * * * *